(12) United States Patent
Huang

(10) Patent No.: US 10,108,302 B2
(45) Date of Patent: Oct. 23, 2018

(54) TOUCH DRIVING SYSTEM WITH LOW DISPLAY NOISE

(71) Applicant: FocalTech Systems Co., Ltd., Hsinchu (TW)

(72) Inventor: Chien-Ying Huang, Hsinchu (TW)

(73) Assignee: FOCALTECH SYSTEMS CO., LTD., Hsinchu (TW)

(*) Notice: Subject to any disclaimer, the term of this patent is extended or adjusted under 35 U.S.C. 154(b) by 337 days.

(21) Appl. No.: 14/856,931

(22) Filed: Sep. 17, 2015

(65) Prior Publication Data

US 2016/0162074 A1    Jun. 9, 2016

(30) Foreign Application Priority Data

Dec. 9, 2014  (TW) .............................. 103142829 A

(51) Int. Cl.
| | |
|---|---|
| *G06F 3/045* | (2006.01) |
| *G06F 3/044* | (2006.01) |
| *G09G 3/36* | (2006.01) |
| *G06F 3/041* | (2006.01) |

(52) U.S. Cl.
CPC ............ *G06F 3/044* (2013.01); *G06F 3/0412* (2013.01); *G06F 3/0418* (2013.01); *G09G 3/3648* (2013.01); *G09G 2310/08* (2013.01)

(58) Field of Classification Search
CPC ...... G06F 3/044; G06F 3/0412; G06F 3/0418; G06F 3/3648; G09G 2310/08
See application file for complete search history.

(56) References Cited

U.S. PATENT DOCUMENTS

| | | | | |
|---|---|---|---|---|
| 2014/0022465 | A1* | 1/2014 | Wu ..................... | H03K 17/9622 349/12 |
| 2014/0160061 | A1* | 6/2014 | Kim .................... | G02F 1/13338 345/174 |
| 2014/0354590 | A1* | 12/2014 | Wang .................... | G06F 3/044 345/174 |
| 2015/0002462 | A1* | 1/2015 | Zhao ...................... | G06F 3/044 345/174 |
| 2015/0138115 | A1* | 5/2015 | Jang ...................... | G06F 3/0418 345/173 |

* cited by examiner

*Primary Examiner* — Mark Edwards

(74) *Attorney, Agent, or Firm* — Bacon & Thomas, PLLC

(57) ABSTRACT

A touch driving system with low display noise comprises a TFT layer having a plurality of display elements for display based on a display driving signal and a display pixel signal; and a touch detection device for detecting if an external object has approached based on a touch driving signal. In a first time period of a display frame, a touch and display control subsystem provides the display driving signal, the display pixel signal, and the touch driving signal to display and perform touch detection simultaneously. In the first time period, the display pixel signal is a constant signal. In a second time period of the display frame, the touch and display control subsystem only provides the display driving signal and the display pixel signal to display.

14 Claims, 8 Drawing Sheets

| Gate driver | T11 | | | | | T21 | | | | |
|---|---|---|---|---|---|---|---|---|---|---|
| | T(1) | T(2) | T(3) | ...... | T(n) | T(n+1) | T(n+2) | T(n+3) | ... | T(n*2) |
| G(n*0+1) | H | L | L | L | L | H | L | L | L | L |
| G(n*0+2) | L | H | L | L | L | L | H | L | L | L |
| G(...) | L | L | H | L | L | L | L | H | L | L |
| G(...) | L | L | L | H | L | L | L | L | H | L |
| G(n*0+n) | L | L | L | L | H | L | L | L | L | H |
| G(n*1+1) | L | L | L | L | L | L | L | L | L | L |
| G(n*1+2) | L | L | L | L | L | L | L | L | L | L |
| G(...) | L | L | L | L | L | L | L | L | L | L |
| G(...) | L | L | L | L | L | L | L | L | L | L |
| G(n*1+n) | L | L | L | L | L | L | L | L | L | L |
| G(...) | ... | ... | ... | ... | ... | ... | ... | ... | ... | ... |
| G(...) | ... | ... | ... | ... | ... | ... | ... | ... | ... | ... |
| G(...) | ... | ... | ... | ... | ... | ... | ... | ... | ... | ... |
| G(...) | ... | ... | ... | ... | ... | ... | ... | ... | ... | ... |
| G(...) | ... | ... | ... | ... | ... | ... | ... | ... | ... | ... |
| G(n*p+1) | L | L | L | L | L | L | L | L | L | L |
| G(n*p+2) | L | L | L | L | L | L | L | L | L | L |
| G(...) | L | L | L | L | L | L | L | L | L | L |
| G(...) | L | L | L | L | L | L | L | L | L | L |
| G(n*p+n) | L | L | L | L | L | L | L | L | L | L |
| Source Driver | Fixed display pattern | | | | | Normal display | | | | |
| Touch Driving & Sensing | Touch detection | | | | | | | | | |

FIG. 6A

|  | T12 | | | | | T22 | | | | |
| --- | --- | --- | --- | --- | --- | --- | --- | --- | --- | --- |
| Gate driver | T(n*2+1) | T(n*2+2) | T(n*2+3) | ...... | T(n*3) | T(n*3+1) | T(n*3+2) | T(n*3+3) | ...... | T(n*4) |
| G(n*0+1) | L | L | L | L | L | L | L | L | L | L |
| G(n*0+2) | L | L | L | L | L | L | L | L | L | L |
| G(···) | L | L | L | L | L | L | L | L | L | L |
| G(···) | L | L | L | L | L | L | L | L | L | L |
| G(n*0+n) | L | L | L | L | L | L | L | L | L | L |
| G(n*1+1) | H | L | L | L | L | H | L | L | L | L |
| G(n*1+2) | L | H | L | L | L | L | H | L | L | L |
| G(···) | L | L | H | L | L | L | L | H | L | L |
| G(···) | L | L | L | H | L | L | L | L | H | L |
| G(n*1+n) | L | L | L | L | H | L | L | L | L | H |
| G(···) | ... | ... | ... | ... | ... | ... | ... | ... | ... | ... |
| G(···) | ... | ... | ... | ... | ... | ... | ... | ... | ... | ... |
| G(···) | ... | ... | ... | ... | ... | ... | ... | ... | ... | ... |
| G(···) | ... | ... | ... | ... | ... | ... | ... | ... | ... | ... |
| G(···) | ... | ... | ... | ... | ... | ... | ... | ... | ... | ... |
| G(n*p+1) | L | L | L | L | L | L | L | L | L | L |
| G(n*p+2) | L | L | L | L | L | L | L | L | L | L |
| G(···) | L | L | L | L | L | L | L | L | L | L |
| G(···) | L | L | L | L | L | L | L | L | L | L |
| G(n*p+n) | L | L | L | L | L | L | L | L | L | L |
| Source Driver | Fixed display pattern | | | | | Normal display | | | | |
| Touch Driving & Sensing | Touch detection | | | | | | | | | |

| Gate driver | T(n*2*p+1) | T(n*2*p+2) | ... | T(n*2*p+n) | T(n*2*p+n+1) | T(n*2*p+n+2) | T(n*2*p+n+3) | ... | T(n*2*p+n+n) |
|---|---|---|---|---|---|---|---|---|---|
| G(n*0+1) | L | L | L | L | L | L | L | L | L |
| G(n*0+2) | L | L | L | L | L | L | L | L | L |
| G(...) | L | L | L | L | L | L | L | L | L |
| G(...) | L | L | L | L | L | L | L | L | L |
| G(n*0+n) | L | L | L | L | L | L | L | L | L |
| G(n*1+1) | L | L | L | L | L | L | L | L | L |
| G(n*1+2) | L | L | L | L | L | L | L | L | L |
| G(...) | L | L | L | L | L | L | L | L | L |
| G(...) | L | L | L | L | L | L | L | L | L |
| G(n*1+n) | L | L | L | L | L | L | L | L | L |
| G(...) | H | L | L | L | L | L | L | L | L |
| ... | L | H | L | L | L | L | L | L | L |
| G(...) | L | L | H | L | L | L | L | L | L |
| G(n*p+1) | L | L | L | H | H | L | L | L | L |
| G(n*p+2) | L | L | L | L | L | H | L | L | L |
| G(...) | L | L | L | L | L | L | H | L | L |
| G(...) | L | L | L | L | L | L | L | H | L |
| G(n*p+n) | L | L | L | L | L | L | L | L | H |
| Source Driver | Fixed display pattern | | | | Normal display | | | | |
| Touch Driving & Sensing | Touch detection | | | | | | | | |

T1p+1 / T2p+1

TOUCH DRIVING SYSTEM WITH LOW DISPLAY NOISE

BACKGROUND OF THE INVENTION

1. Field of the Invention

The present invention relates to the technical field of touch display, and more particularly, to a touch driving system with low noise for stable display.

2. Description of Related Art

In recent years, a touch detection device is installed in a display device to allow data input by touching the display device. The touch detection device is known as a touch panel and the display device can be a liquid crystal display (LCD). Namely, the touch panel is integrated on the LCD and various icons are displayed on the display screen to replace the prior mechanical push buttons or keys. With the touch detection device, input devices, such as a keyboard, a mouse, and the like, are no longer required. Accordingly, display screens with touch panels are widely used in handheld devices.

Detection methods, such as optical detection and resistance detection, have been used by touch detection devices for a period of time. However, because of the relatively simpler structure and low power consumption, capacitive touch detection devices are typically used in hand-held devices.

FIG. 1 is a timing diagram illustrating the operation of a typical display device with a capacitive touch detection device. As shown in FIG. 1, a typical display device displays in the time periods A, B, C, and D, performs touch detection in the time period E, and displays again in the time period F. During touch detection, the operation of the circuit involved in display has to be halted; thus, charge accumulation occurs on the circuit involved in display, and noises are generated.

Therefore, it is desirable to provide an improved touch driving system with low noise to mitigate and/or obviate the aforementioned problems.

SUMMARY OF THE INVENTION

The object of the present invention is to provide a touch driving system with low noise, which can reduce the interference by noise during touch detection. In addition, by inserting a black frame during touch detection, the time required for an additional black frame insertion can be saved.

To achieve the object, the present invention provides a touch driving system with low noise. The system comprises a thin film transistor (TFT) layer, a touch detection device, and a touch and display control subsystem. The TFT layer has a plurality of display elements for display based on a display driving signal and a display pixel signal. The touch detection device detects if an external object has approached based on a touch driving signal. The touch and display control subsystem is connected to the TFT layer and the touch detection device. The touch and display control subsystem sequentially provides the display driving signal to the display elements to correspondingly activate the display elements and provides the display pixel signal to the display elements for display. The touch and display control subsystem also sequentially provides the touch driving signal to the touch detection device and the touch detection device samples a sensed voltage to detect if an external object has approached for touch detection. In a first time period of a display frame, the touch and display control subsystem provides the display driving signal, the display pixel signal, and the touch driving signal to display and perform touch detection simultaneously. In the first time period, the display pixel signal is a constant signal for a black frame insertion. In a second time period of the display frame, the touch and display control subsystem only provides the display driving signal and the display pixel signal to display.

Other objects, advantages, and novel features of the invention will become more apparent from the following detailed description when taken in conjunction with the accompanying drawings.

BRIEF DESCRIPTION OF THE DRAWINGS

FIGS. 6A to 6C are timing tables illustrating the operation of the touch driving system with low noise of FIG. 2 according to the embodiment of the present invention.

DETAILED DESCRIPTION OF THE PREFERRED EMBODIMENT

Figure 1:
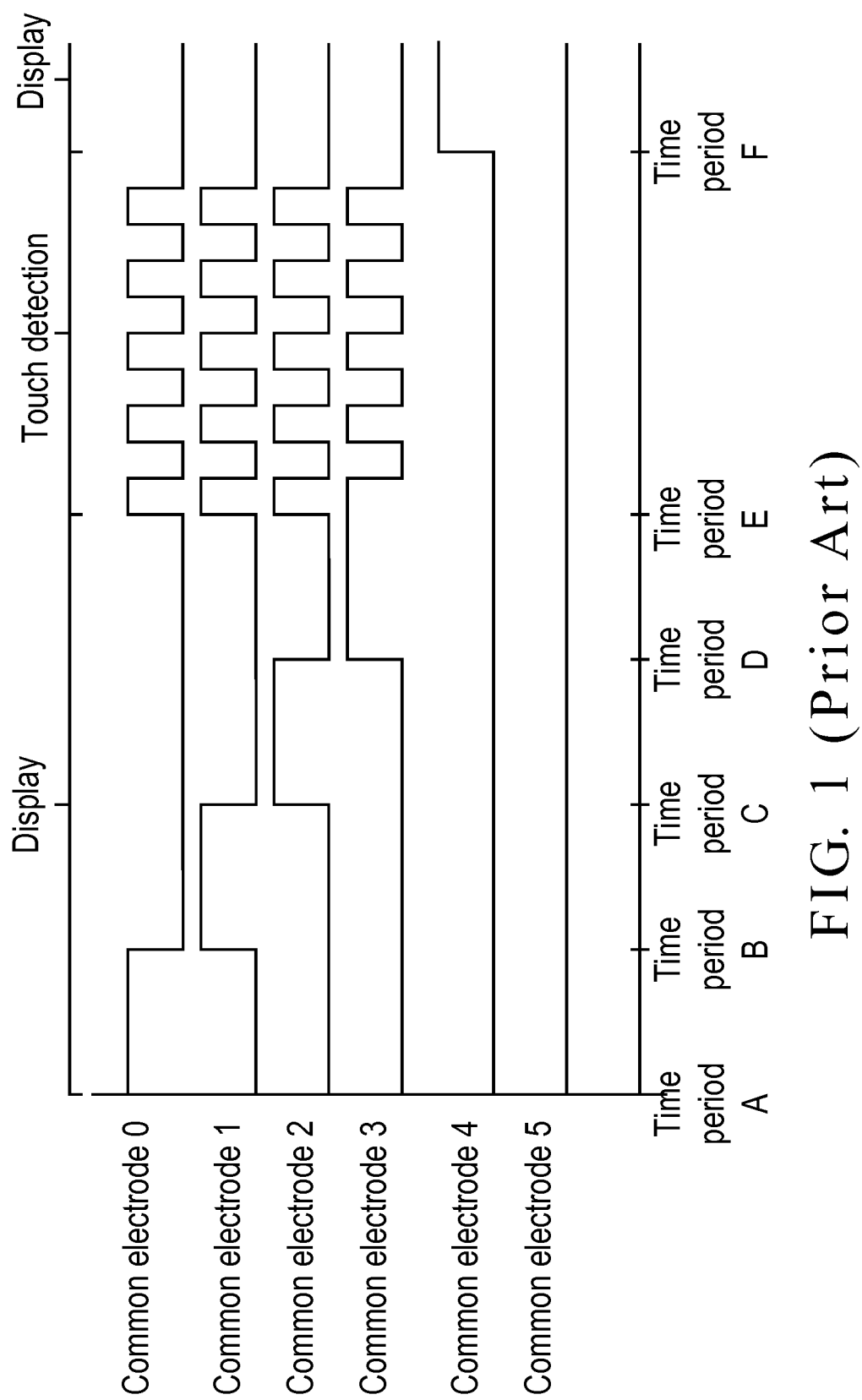
FIG. 1 is a timing diagram illustrating the operation of a typical display device with a capacitive touch detection device.
Figure 2:
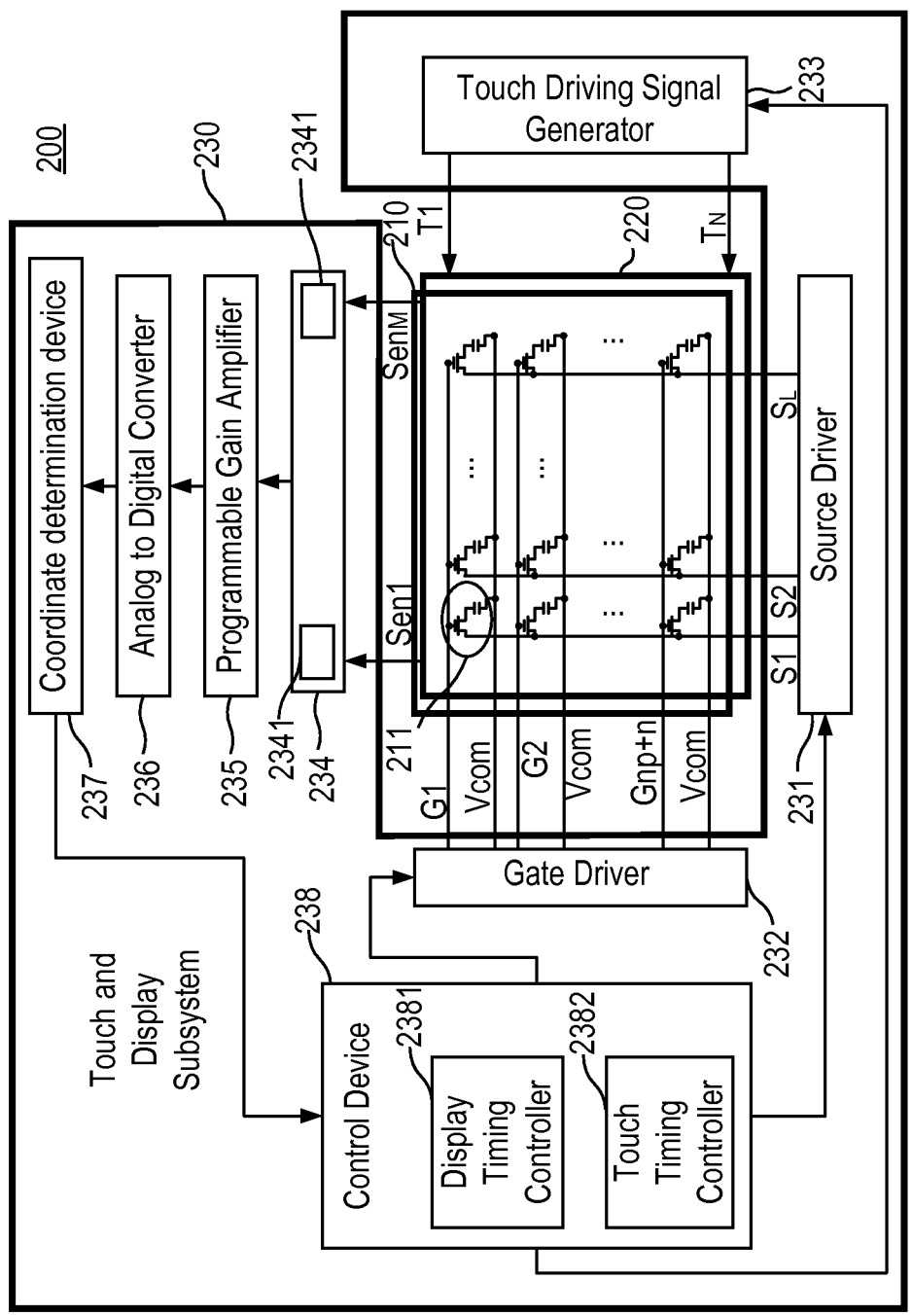
FIG. 2 is a block diagram of a touch driving system with low noise according to one embodiment of the present invention.

FIG. 2 is a block diagram of a touch driving system 200 with low noise according to one embodiment of the present invention. The system 200 includes a thin film transistor (TFT) layer 210, a touch detection device 220, and a touch and display control subsystem 230.

The TFT layer 210 has a plurality of display elements 211. Each of the display elements 211 displays based on a display driving signal and a display pixel signal.

The TFT layer 210 has nxp+n gate driving lines G1, G2, . . . , Gnxp+n and L source driving lines S1, S2, . . . , SL. The nxp+n gate driving lines G1, G2, . . . , Gnxp+n and the L source driving lines S1, S2, . . . , SL are arranged in a first direction (X) and a second direction (Y), respectively. Each intersection of the nxp+n gate driving lines G1, G2, . . . , Gnxp+n and L source driving lines S1, S2, . . . , SL has one of the display elements 211, where n, p, L are each a positive integer.

Figure 3:
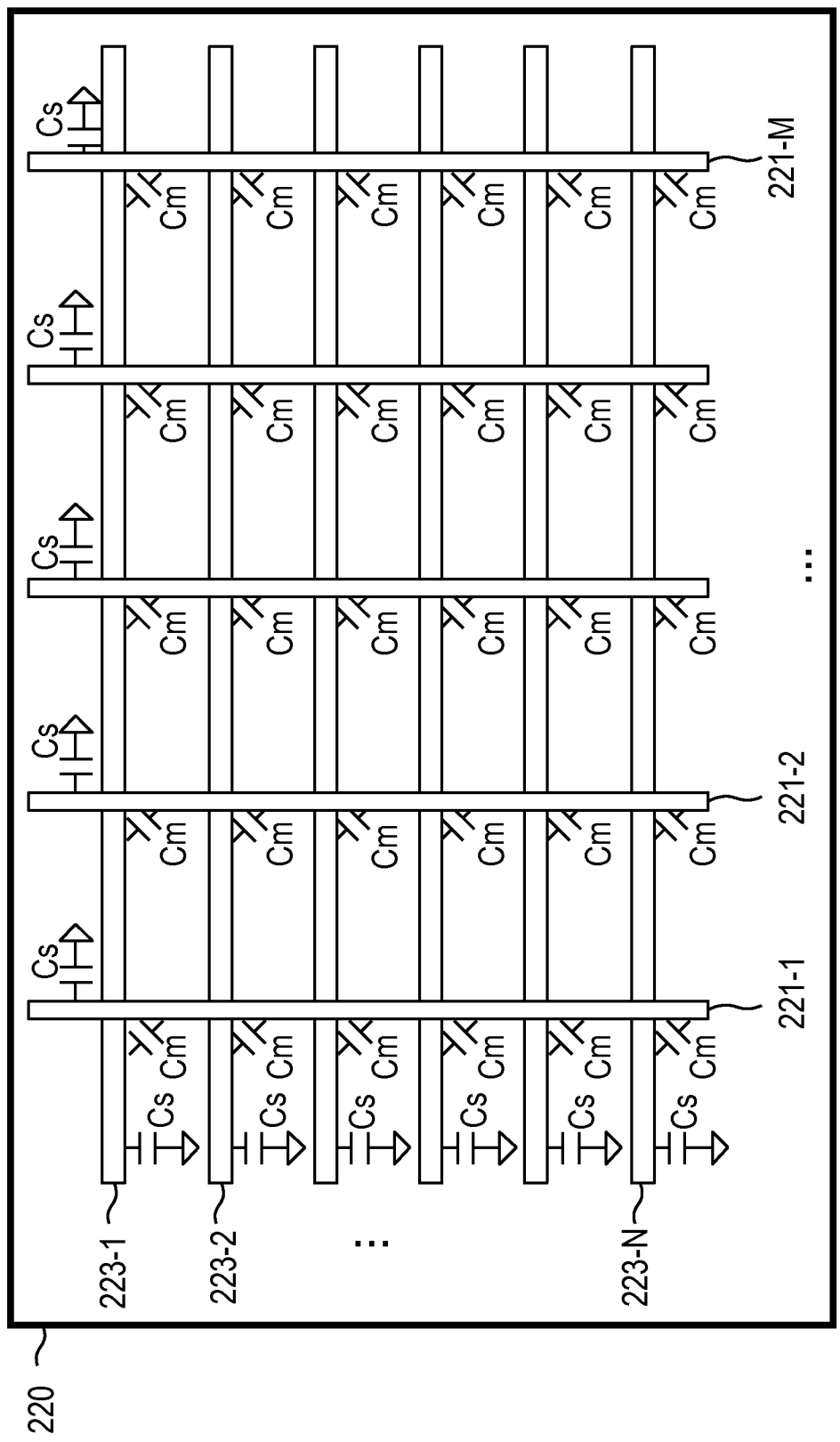
FIG. 3 is a schematic view of the touch detection device of FIG. 2 according to the embodiment of the present invention.

The touch detection device 220 detects if an external object has approached based on a touch driving signal. FIG. 3 is a schematic view of the touch detection device 220 of FIG. 2 according to the embodiment of the present invention. In one preferable embodiment, the touch detection device 220 can be a plurality of sensing units made of transparent Indium Tin Oxide (ITO) material arranged in a matrix to detect one or more accurate touch positions. As shown in FIG. 3, the touch detection device 220 has M first conductor lines (221-1 to 221-M) and N second conductor lines (223-1 to 223-N), where M and N are each a positive integer. Each of the M first conductor lines and the N second conductor lines has parasitic capacitance and stray capacitance. Each overlap region of the M first conductor lines and N second conductor lines forms a mutual capacitance Cm. Moreover, each of the M first conductor lines (221-1 to 221-M) and the N second conductor lines (223-1 to 223-N) has a self-capacitance Cs with reference to the ground capacitance.

Referring back to FIG. 2, the touch and display control subsystem 230 is connected to the TFT layer 210 and the touch detection device 220. The touch and display control subsystem 230 sequentially provides the display driving signal to the display elements 211 to correspondingly activate the display elements 211 and provides the display pixel signal to the display elements 211 for display. The touch and display control subsystem 230 also sequentially provides the touch driving signal to the touch detection device 220. The touch detection device 220 samples a sensed voltage to detect if an external object has approached for touch detection.

The touch and display control subsystem 230 includes a source driver 231, a gate driver 232, a touch driving signal generator 233, a sensor 234, a programmable gain amplifier 235, an analog to digital converter 236, a coordinate determination device 237, and a control device 238.

The source driver 231 is connected to the TFT layer 210 in order to drive the TFT layer 210 based on the display pixel signal.

The gate driver 232 is connected to the TFT layer 210 in order to generate the display driving signal to drive the TFT layer 210.

The touch driving signal generator 233 generates the touch driving signal (T1 to TN) and also generates the touch driving signals (T1 to TN) required for mutual capacitance sensing.

The sensor 234 is connected to the touch detection device 220 in order to sense a signal of the touch detection device 220.

The control device 238 includes a display timing controller 2381 and a touch timing controller 2382. The control device 238 is connected to the source driver 231, the gate driver 232, the touch driving signal generator 233, the sensor 234, the programmable gain amplifier 235, the analog to digital converter 236, and the coordinate determination device 237. The control device 238 provides the touch driving signal to the N second conductor lines (223-1 to 223-N), configures the gate driver 232 to sequentially output the display driving signal to the nxp+n gate driving lines, and configures the source driver 231 to output the display pixel signal to the L source driving lines.

The display timing controller 2381 is connected to the source driver 231 and the gate driver 232 in order to provide timings of the display pixel signal and the display driving signal to the source driver 231 and the gate driver 232.

The touch timing controller 2382 is connected to the display timing controller 2381, the touch driving signal generator 233, and the sensor 234 in order to provide the touch driving signal (T1 to TN) to the N second conductor lines (223-1 to 223-N) and enable the sensor 234 to sense respective signals of the M first conductor lines (221-1 to 221-M) of the touch detection device 220.

The sensor 234 is connected to the touch detection device 220 in order to sense a signal of the touch detection device 220. The sensor 234 has M sensing circuits 2341 each connected to one of the M first conductor lines (221-1 to 221-M) of the touch detection device 220 for detecting the mutual capacitance and correspondingly generating M detection signals.

Figure 4:
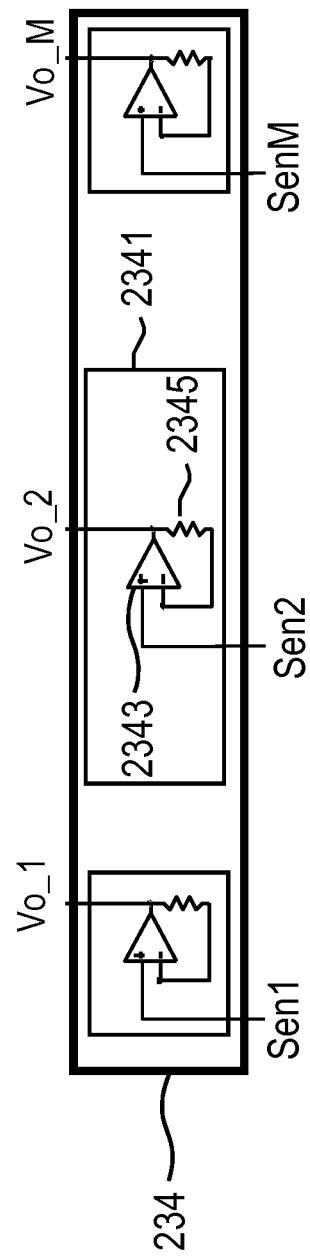
FIG. 4 is a circuit diagram of the sensing circuit of FIG. 2 according to the embodiment of the present invention.

FIG. 4 is a circuit diagram of the sensing circuit 2341 of FIG. 2 of the present invention. Each of the sensing circuits 2341 is composed of an amplifier 2343 and a resistor 2345. The amplifier 2343 has a positive input terminal connected to one of the M first conductor lines (221-1 to 221-M). The resistor 2345 has one end connected to a negative input terminal of the amplifier 2343 and the other end connected to an output terminal of the amplifier 2343.

Referring back to FIG. 2, the programmable gain amplifier 235 is connected to the sensor 234 in order to amplify the M detection signals and generate M amplified detection signals. The analog to digital converter 236 is connected to the programmable gain amplifier 235 in order to convert the M amplified detection signals into M digital detection signals. The coordinate determination device 237 is connected to the analog to digital converter 236 in order to determine a coordinate of the external object based on the M digital detection signals.

The operating principle of the touch and display control subsystem 230 in one embodiment of the present invention is such that: when providing the touch driving signal, the touch and display control subsystem 230 simultaneously provides the display pixel signal, which is a constant signal, for a black frame insertion. Accordingly, there is no need to perform an additional black frame insertion on an LCD screen; thereby, saving the time required for the additional black frame insertion. Furthermore, since the display driving signal is a constant signal, no noise is generated during touch detection.

Figure 5:
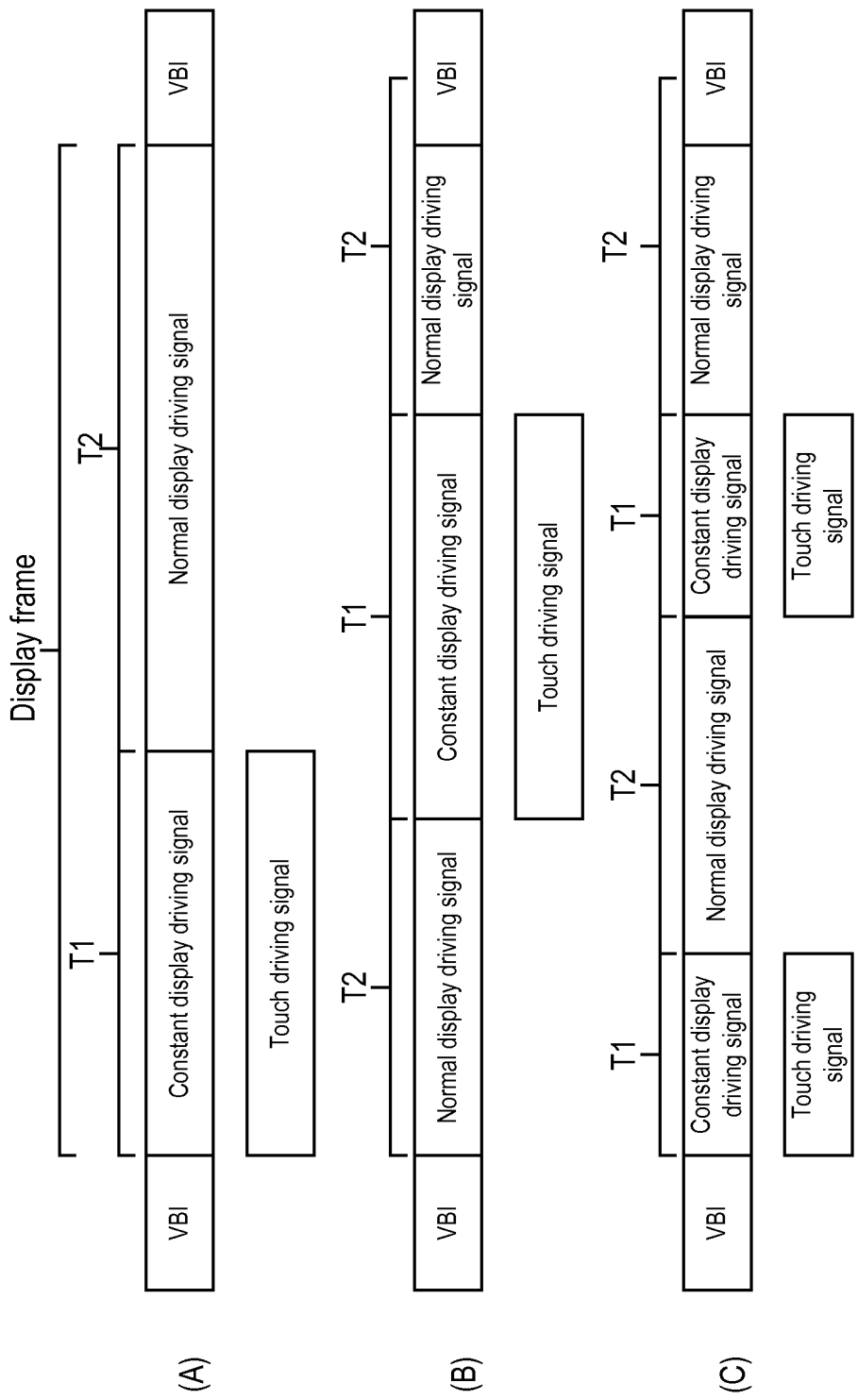
FIG. 5 is a timing diagram illustrating the operation of the touch driving system with low noise of FIG. 2 according to the embodiment of the present invention.

FIG. 5 is a timing diagram illustrating the operation of the touch driving system 200 with low display noise of FIG. 2 according to the embodiment of the present invention. As shown in FIG. 5, in a first time period T1 of a display frame, the touch and display control subsystem provides the display driving signal, the display pixel signal, and the touch driving signal to display and perform touch detection at the same time. In the first time period T1, the display pixel signal is a constant signal. In a second time period T2 of the display frame, the touch and display control subsystem only provides the display driving signal and the display pixel signal to display. In one embodiment, the time length of the second time period T2 can be greater than or equal to that of the first time period T1. In the first time period T1, the constant signal indicates the display pixel signal has a fixed value. Namely, a fixed display pattern is displayed in the first time period T1 and the display pixel signal is a gray scale signal. If the display pixel signal has a size of eight bits, the value of the display pixel signal being 0 indicates that a black frame is inserted and the value of the display pixel signal being 255 indicates that a white frame is inserted. Next, in the second time period T2, the touch and display control subsystem 230 provides the normal display pixel signal. In this embodiment, the display pixel signal is a square wave signal and the touch driving signal is also a square wave signal. The frequency of the touch driving signal is greater than or equal to that of the display pixel signal. In other embodiments, the touch driving signal can be a continuous signal. The frequency of the touch driving signal is greater than or equal to that of the display pixel signal.

As shown in the portion (A) of FIG. 5, the display frame is divided into one first time period T1 and one second time period T2. In the portion (A) of FIG. 5, when the display frame starts, a black frame is inserted and touch detection is performed. Normal display then occurs in the second time period T2.

As shown in the portion (B) of FIG. 5, the display frame is divided into one first time period T1 and two second time periods T2. In the portion (B) of FIG. 5, when the display frame starts, normal display first occurs. Next, a black frame is inserted and touch detection is performed. Lastly, normal display occurs again.

As shown in the portion (C) of FIG. 5, the display frame is divided into two first time periods T1 and two second time periods T2. In the portion (C) of FIG. 5, when the display frame starts, a black frame is inserted and touch detection is performed. Normal display then occurs followed by another black frame insertion and touch detection. Lastly, normal display occurs again.

As shown in the portions (A)-(C) of FIG. 5, the touch and display control subsystem can execute at least one black frame insertion and touch detection in one display frame. In addition, the black frame insertion and touch detection can occur at any time in the display frame.

When the black frame insertion and touch detection are executed, the touch and display control subsystem 230 can sequentially or concurrently activate the display elements 211 corresponding to the selected gate driving lines.

When the touch and display control subsystem 230 sequentially activates the display elements 211 corresponding to the selected gate driving lines, in an i-th first time period, the touch and display control subsystem 230 provides the display driving signal to the (n(i−1)+1)-th to (nxi)-th gate driving lines, where i is a positive integer, and 1≥i≥p. At the same time, the touch and display control subsystem 230 also provides the display pixel signal, which is a constant signal, to the L source driving lines. In an i-th second time period, the touch and display control subsystem 230 provides the display driving signal to the (n(i−1)+1)-th to (nxi)-th gate driving lines. At the same time, the touch and display control subsystem 230 also provides the display pixel signal to the L source driving lines.

FIGS. 6A to 6C are timing tables illustrating the operation of the touch driving system 200 with low noise of FIG. 2 according to the embodiment of the present invention. During touch detection, the touch and display control subsystem 230 sequentially activates the display elements 211 corresponding to the selected gate driving lines. As shown in FIG. 6A, in the 1-st first time period T11, the 1-st to n-th gate driving lines are sequentially marked with "H" to indicate the display elements 211 corresponding to the 1-st to n-th driving lines are sequentially activated. The source driving lines are marked with "fixed display pattern" to indicate a fixed display pattern being displayed. Hence, in the 1-st first time period T11, display and touch detection occur simultaneously. In the 1-st second time period T21, the 1-st to n-th gate driving lines are sequentially marked with "H" to indicate the display elements 211 corresponding to the 1-st to n-th driving lines are sequentially activated. The source driving lines are marked with "normal display" to indicate normal display occurs. Since the 1-st to n-th gate driving lines in the 1-st second time period T21 execute normal display, the 1-st gate driving line in the time period T(n+1) is marked with "H" to indicate the display elements 211 corresponding to the 1-st driving line are activated again to execute normal display.

As shown in FIG. 6B, in the 2-nd first time period T12, the 1-st to n-th gate driving lines are sequentially marked with "H" to indicate the display elements 211 corresponding to the (n+1)-th to 2n-th driving lines are sequentially activated. The source driving lines are marked with "fixed display pattern" to indicate a fixed display pattern being displayed. Consequently, in the 2-nd first time period T12, display and touch detection occur simultaneously. In the 2-nd second time period T22, the (n+1)-th to 2n-th gate driving lines are sequentially marked with "H" to indicate the display elements 211 corresponding to the (n+1)-th to 2n-th driving lines are sequentially activated. The source driving lines are marked with "normal display" to indicate normal display occurs.

As shown in FIG. 6C, in the (p+1)-th first time period (T1p+1), the (nxp+1)-th to (nxp+n)-th gate driving lines are sequentially marked with "H" to indicate the display elements 211 corresponding to the (nxp+1)-th to (nxp+n)-th driving lines are sequentially activated. The source driving lines are marked with "fixed display pattern" to indicate a fixed display pattern being displayed. Thus, in the (p+1)-th first time period (T1p+1), display and touch detection occur simultaneously. In the (p+1)-th second time period (T2p+1), the (nxp+1)-th to (nxp+n)-th gate driving lines are sequentially marked with "H" to indicate the display elements 211 corresponding to the (nxp+1)-th to (nxp+n)-th driving lines are sequentially activated. The source driving lines are marked with "normal display" to indicate normal display occurs.

When the touch and display control subsystem 230 concurrently activates the display elements 211 corresponding to the selected gate driving lines, the selected gate driving lines are concurrently marked with "H" to indicate the corresponding display elements 211 are activated at the same time.

In view of the foregoing description, it is known that in the entire display frame, the touch and display control subsystem 230 continuously provides the display driving signal and the display pixel signal. The display pixel signal is a constant signal when the touch driving signal is provided. The display pixel signal is a normal display signal when the touch driving signal is not provided. Therefore, when the touch and display control subsystem 230 performs touch detection, the noises can be reduced, and touch detection is not interfered by the display signal. Furthermore, since the touch and display control subsystem 230 simultaneously provides a constant signal for a black frame insertion during touch detection, the additional time required for an additional black frame insertion can be saved.

Although the present invention has been explained in relation to its preferred embodiments, it is to be understood that many other possible modifications and variations can be made without departing from the spirit and scope of the invention as hereinafter claimed.

What is claimed is:

1. A touch driving system with low display noise, comprising:
   a thin film transistor layer having a plurality of gate driving lines and a plurality of source driving lines arranged respectively in a first direction and a second direction, and a plurality of display elements, each being disposed at an intersection of the gate driving lines and the source driving lines, for display based on a display driving signal and a display pixel signal;
   a touch detection device for detecting if an external object has approached based on a touch driving signal; and
   a touch and display control subsystem connected to the thin film transistor layer and the touch detection device for sequentially providing the display driving signal to the display elements to correspondingly activate the display elements and providing the display pixel signal to the display elements for display, the touch and display control subsystem also sequentially provides the touch driving signal to the touch detection device and the touch detection device samples a sensed voltage to detect if an external object has approached for touch detection;

wherein a display frame is divided into a plurality of time period sets each including a first time period and a second time period, and the gate driving lines are grouped into a plurality of gate driving line sets respectively corresponding to the time period sets, each gate driving line set having a plurality of gate driving lines, wherein, in the first time period of each time period set of the display frame, a display timing controller of the touch and display control subsystem sequentially provides the display driving signal to the gate driving lines of one gate driving line set corresponding to said each time period set and the display pixel signal to all the source driving lines and the display pixel signal to perform display operation and a touch timing controller of the touch and display control subsystem provides the touch driving signal to perform touch detection, thereby simultaneously performing display operation and touch detection in the first time period, where the display pixel signal is a constant signal for a black frame insertion in the first time period, and wherein, in the second time period of each time period set of the display frame, the display timing controller of the touch and display control subsystem only provides the display driving signal to the gate driving lines of one gate driving line set corresponding to said each time period set and the display pixel signal to all the source driving lines to display.

2. The touch driving system with low display noise as claimed in claim 1, wherein the second time period has a time length greater than or equal to that of the first time period.

3. The touch driving system with low display noise as claimed in claim 1, wherein the display driving signal is a square wave signal.

4. The touch driving system with low display noise as claimed in claim 3, wherein the touch driving signal is a square wave signal and has a frequency greater than or equal to that of the display driving signal.

5. The touch driving system with low display noise as claimed in claim 1, wherein the touch driving signal is a continuous signal and has a frequency greater than or equal to that of the display driving signal.

6. The touch driving system with low display noise as claimed in claim 1, wherein the thin film transistor layer has nxp+n gate driving lines and L source driving lines, where n, p, L are each a positive integer.

7. The touch driving system with low display noise as claimed in claim 6, wherein, in the first time period, the display timing controller of the touch and display control subsystem provides the display driving signal to the 1-st to n-th gate driving lines and the display pixel signal, which is a constant signal, to the L source driving lines.

8. The touch driving system with low display noise as claimed in claim 7, wherein, in the second time period, the display timing controller of the touch and display control subsystem provides the display driving signal to the 1-st to n-th gate driving lines and the display pixel signal to the L source driving lines.

9. The touch driving system with low display noise as claimed in claim 6, wherein, in an i-th first time period, the display timing controller of the touch and display control subsystem provides the display driving signal to (n(i−1)+1)-th to (nxi)-th gate driving lines and the display pixel signal, which is a constant signal, to the L source driving lines, where i is a positive integer and $1 \leq i \leq p$.

10. The touch driving system with low display noise as claimed in claim 9, wherein, in an i-th second time period, the display timing controller of the touch and display control subsystem provides the display driving signal to the (n(i−1)+1)-th to (nxi)-th gate driving lines and the display pixel signal to the L source driving lines.

11. The touch driving system with low display noise as claimed in claim 1, wherein the touch detection device has M first conductor lines and N second conductor lines, each of the M first conductor lines and N second conductor lines has parasitic capacitance and stray capacitance, and each overlap region of the M first conductor lines and N second conductor lines forms a mutual capacitance, where M and N are each a positive integer.

12. The touch driving system with low display noise as claimed in claim 11, wherein the touch and display control subsystem has a sensor with M sensing circuits for detecting the mutual capacitance and correspondingly generating M detection signals.

13. The touch driving system with low display noise as claimed in claim 12, wherein the touch and display control subsystem further comprises:
a programmable gain amplifier connected to the M sensing circuits for amplifying the M detection signals and further generating M amplified detection signals;
an analog to digital converter connected to the programmable gain amplifier for converting the M amplified detection signals into M digital detection signals; and
a coordinate determination device connected to the analog to digital converter for determining a coordinate of the external object based on the M digital detection signals.

14. The touch driving system with low display noise as claimed in claim 13, wherein each of the M sensing circuits is composed of an amplifier and a resistor, the amplifier has a positive input terminal connected to one of the M first conductor lines and the resistor has one end connected to a negative input terminal of the amplifier and the other end connected to an output terminal of the amplifier.

* * * * *